US010197984B2

(12) United States Patent
Bharti et al.

(10) Patent No.: US 10,197,984 B2
(45) Date of Patent: Feb. 5, 2019

(54) AUTOMATED ENERGY LOAD FORECASTER

(71) Applicant: INTERNATIONAL BUSINESS MACHINES CORPORATION, Armonk, NY (US)

(72) Inventors: Harish Bharti, Pune (IN); Binayak Dutta, Pune (IN); Abhay K. Patra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 14/880,308

(22) Filed: Oct. 12, 2015

(65) Prior Publication Data
US 2017/0102683 A1    Apr. 13, 2017

(51) Int. Cl.
H02J 3/00      (2006.01)
G06Q 50/06    (2012.01)
H02J 13/00    (2006.01)
G05B 19/042   (2006.01)
G05D 5/00     (2006.01)

(52) U.S. Cl.
CPC ....... G05B 19/0428 (2013.01); G05B 19/042 (2013.01); G06Q 50/06 (2013.01); G05B 2219/2639 (2013.01); H02J 13/0079 (2013.01); H02J 2003/003 (2013.01)

(58) Field of Classification Search
CPC .................... G05B 19/0428; G05B 2219/2639
USPC ....................................................... 700/291
See application file for complete search history.

(56) References Cited

U.S. PATENT DOCUMENTS

| 3,789,201 A | 1/1974 | Carpenter et al. |
| 6,577,962 B1 | 6/2003 | Afshari |
| 6,865,450 B2 | 3/2005 | Masticola et al. |
| 7,295,960 B2 * | 11/2007 | Rappaport ............ G06F 17/509 455/403 |
| 7,305,282 B2 | 12/2007 | Chen |

(Continued)

FOREIGN PATENT DOCUMENTS

| CN | 102682220 A | 9/2012 |
| CN | 102738799 A | 10/2012 |

(Continued)

OTHER PUBLICATIONS

Alfares et al., "Electric load forecasting: literature survey and classification of methods", International Journal of Systems Science, 2002, vol. 33, No. 1, pp. 23-34. (Year: 2002).*

(Continued)

Primary Examiner — Ryan D. Coyer
(74) Attorney, Agent, or Firm — Patrick J. Daugherty; Daugherty & Del Zoppo Co., LPA

(57) ABSTRACT

Energy load forecasts are generated via model(s) for the grid hierarchy elements for different forecast time scale periods as a function of different sets of prioritized contextual influencing factors for respective associated combinations of grid hierarchy elements and forecast time scale periods. Relative priority values of the sets of the contextual influencing factors are iteratively weighted until a revised energy load forecast generated as a function of the weighted values via the model(s) is within a threshold value of a historic energy load data value for the associated combination of the grid hierarchy element and forecast time scale period.

20 Claims, 6 Drawing Sheets

(56) References Cited

U.S. PATENT DOCUMENTS

| | | | |
|---|---|---|---|
| 7,474,995 B2 * | 1/2009 | Masiello | G06Q 10/06 703/2 |
| 7,979,222 B2 | 7/2011 | Donde et al. | |
| 8,374,903 B2 | 2/2013 | Little | |
| 8,392,031 B2 | 3/2013 | Krok et al. | |
| 8,406,935 B2 | 3/2013 | Ko et al. | |
| 8,538,593 B2 | 9/2013 | Sun et al. | |
| 2008/0262820 A1 * | 10/2008 | Nasle | G06Q 10/04 703/18 |
| 2012/0253532 A1 | 10/2012 | McMullin et al. | |
| 2013/0024170 A1 | 1/2013 | Dannecker et al. | |
| 2013/0079939 A1 * | 3/2013 | Darden, II | G06Q 10/063 700/291 |
| 2013/0096983 A1 | 4/2013 | Forbes et al. | |
| 2014/0005849 A1 | 1/2014 | Sun et al. | |
| 2014/0156322 A1 | 6/2014 | Monforte et al. | |
| 2015/0186904 A1 * | 7/2015 | Guha | G06Q 10/06316 705/7.26 |

FOREIGN PATENT DOCUMENTS

| | | |
|---|---|---|
| CN | 102930356 A | 2/2013 |
| CN | 202918497 U | 5/2013 |
| CN | 103208036 A | 7/2013 |
| CN | 103268519 A | 8/2013 |
| CN | 103730893 A | 4/2014 |
| JP | H08136032 A | 5/1996 |
| KR | 1020130074043 A | 7/2013 |
| WO | WO0227620 A1 | 4/2002 |
| WO | WO2012105105 A1 | 8/2012 |

OTHER PUBLICATIONS

Gross et al., "Short-term Load Forecasting", IEEE, 16pg. (Year: 1987).*

Kampf et al., "A framework for classifying and comparing distributed hillslope and catchment hydrologic models", Water Resources Research, vol. 43, W05423, 24pg. (Year: 2007).*

GE Digital Energy, PowerOn Fusion Advanced Distribution Management System, GE Imagination at Work, 2013.

ISO New England, Committees and Groups, Reliability Committee and Working Groups, 2015.

Peter Mell et al, The NIST Definition of Cloud Computing, National Institute of Standards and Technology, Special Publication 800-145, 2011.

* cited by examiner

| Time Scale Period | Contextual influencing factor | Prioritization for Modeling |
|---|---|---|
| Immediate - Next 24 Hours | Utilization History | 1 |
| | Weather Forecast | 2 |
| | Special Event / Festival | 3 |
| | Holiday | 4 |
| | Macro Economic Factor | 5 |
| | Growth / Expansion Industrial | 6 |
| | Growth / Expansion Commercial | 7 |
| | Growth / Expansion Residential | 8 |
| | Renewable Energy Generation | 9 |
| Short Term - Weekly Forecast | Utilization History | 1 |
| | Weather Forecast | 2 |
| | Special Event / Festival | 3 |
| | Holidays | 4 |
| | Macro Economic Factor | 5 |
| | Growth / Expansion Industrial | 6 |
| | Growth / Expansion Commercial | 7 |
| | Growth / Expansion Residential | 8 |
| | Renewable Energy Generation | 9 |
| Mid Term - Monthly Forecast | Utilization History | 1 |
| | Special Event / Festival | 2 |
| | Weather Forecast | 3 |
| | Macro Economic Factor | 4 |
| | Growth / Expansion Industrial | 5 |
| | Growth / Expansion Commercial | 6 |
| | Growth / Expansion Residential | 7 |
| | Holidays | 8 |
| | Renewable Energy Generation | 9 |
| Long Term - Yearly Forecast | Utilization History | 1 |
| | Macro Economic Factor | 2 |
| | Growth / Expansion Industrial | 3 |
| | Growth / Expansion Commercial | 4 |
| | Growth / Expansion Residential | 5 |
| | Special Event | 6 |
| | Weather Forecast | 7 |
| | Green Aware End Users | 8 |
| | Renewable Energy Generation | 9 |

FIG. 5

|  | M1W1 | M1W2 | M1W3 | M2W1 | M2W2 | M2W3 | M3W1 | M3W2 | M3W3 |
|---|---|---|---|---|---|---|---|---|---|
| F1 | 1 | 0.5 | 0.2 | 0.3 | 0.05 | 0.1 | 0.05 | 0.2 | 0.3 |
| F2 | 0 | 0.1 | 0.15 | 0.1 | 0.05 | 0.1 | 0.05 | 0.15 | 0.1 |
| F3 | 0 | 0.1 | 0.15 | 0.1 | 0.15 | 0.1 | 0.15 | 0.15 | 0.1 |
| F4 | 0 | 0.1 | 0.15 | 0.1 | 0.15 | 0.1 | 0.15 | 0.15 | 0.1 |
| F5 | 0 | 0.05 | 0.15 | 0.1 | 0.15 | 0.15 | 0.15 | 0.15 | 0.1 |
| F6 | 0 | 0.05 | 0.1 | 0.1 | 0.15 | 0.15 | 0.15 | 0.1 | 0.1 |
| F7 | 0 | 0.05 | 0.05 | 0.1 | 0.15 | 0.15 | 0.15 | 0.05 | 0.1 |
| F8 | 0 | 0.05 | 0.05 | 0.1 | 0.15 | 0.15 | 0.15 | 0.05 | 0.1 |
| Root Mean Squared Error | 0.194 | 0.232 | 0.366 | 0.235 | 0.221 | 0.247 | 0.243 | 0.187 | 0.207 |

116 — [ ] → Determine final model as weighted function of the plurality of best weighted sets determined for use with each model
718 —

|  | FINAL -- Set 1 (M1W1) | FINAL -- Set 2 (M2W2) | FINAL -- Set 3 (M3W2) | FINAL -- Set 4 | FINAL -- Set 5 | FINAL -- Set 6 | FINAL -- Set 7 |
|---|---|---|---|---|---|---|---|
| M1W1 | 1 | 0 | 0 | 0.33 | 0.5 | 0.4 | 0.7 |
| M2W2 | 0 | 1 | 0 | 0.33 | 0.25 | 0.4 | 0.15 |
| M3W2 | 0 | 0 | 1 | 0.33 | 0.25 | 0.2 | 0.15 |
| Root Mean Squared Error | 0.194 | 0.221 | 0.187 | 0.182 | 0.164 | 0.275 | 0.257 |

AUTOMATED ENERGY LOAD FORECASTER

BACKGROUND

Utility industry business operations perform energy load forecasting to optimize the purchase of energy and investment in network augmentation, and to assure that energy grid infrastructures will be able to meet forecasted demands. Accuracy in load forecasting helps ensure smooth, ongoing operation of energy grid infrastructures, and may rely on a wide variety of models and input data considerations.

SUMMARY

In one aspect of the present invention, a method for prioritizing and weighting model contextual influencing factors for energy load forecasting includes a processor identifying contextual influencing factors that are each relevant to use with one or more models for energy load forecasting for an energy grid infrastructure element. The energy grid infrastructure element is one of a zonal substation, a sub-transmission feeder, a distribution substation, a distribution feeder and a sub-transmission substation. The processor prioritizes the contextual influencing factors into different sets of relative priority values as a function of relevance to each of different combinations of the grid hierarchy element with different forecast time scale periods, wherein the contextual influencing factor relative priority values differ between the sets. Energy load forecasts are generated via the model(s) for the grid hierarchy element for each of different forecast time scale periods as a function of different ones of the prioritized sets of the contextual influencing factors that are each prioritized for respective associated combinations of the grid hierarchy element and ones of the different forecast time scale periods. The relative priority values of one or more sets of the contextual influencing factors are iteratively weighted until a revised energy load forecast generated as a function of the weighted values via the model(s) is within a threshold value of a historic energy load data value for the associated combination of the grid hierarchy element and forecast time scale period.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies contextual influencing factors that are each relevant to use with one or more models for energy load forecasting for an energy grid infrastructure element. The energy grid infrastructure element is one of a zonal substation, a sub-transmission feeder, a distribution substation, a distribution feeder and a sub-transmission substation. The processor prioritizes the contextual influencing factors into different sets of relative priority values as a function of relevance to each of different combinations of the grid hierarchy element with different forecast time scale periods, wherein the contextual influencing factor relative priority values differ between the sets. Energy load forecasts are generated via the model(s) for the grid hierarchy element for each of different forecast time scale periods as a function of different ones of the prioritized sets of the contextual influencing factors that are each prioritized for respective associated combinations of the grid hierarchy element and ones of the different forecast time scale periods. The relative priority values of one or more sets of the contextual influencing factors are iteratively weighted until a revised energy load forecast generated as a function of the weighted values via the model(s) is within a threshold value of a historic energy load data value for the associated combination of the grid hierarchy element and forecast time scale period.

In another aspect, a computer program product for prioritizing and weighting model contextual influencing factors for energy load forecasting has a computer-readable storage medium with computer readable program code embodied therewith. The computer readable program code includes instructions for execution which cause the processor to identify contextual influencing factors that are each relevant to use with one or more models for energy load forecasting for an energy grid infrastructure element. The energy grid infrastructure element is one of a zonal substation, a sub-transmission feeder, a distribution substation, a distribution feeder and a sub-transmission substation. The processor prioritizes the contextual influencing factors into different sets of relative priority values as a function of relevance to each of different combinations of the grid hierarchy element with different forecast time scale periods, wherein the contextual influencing factor relative priority values differ between the sets. Energy load forecasts are generated via the model(s) for the grid hierarchy element for each of different forecast time scale periods as a function of different ones of the prioritized sets of the contextual influencing factors that are each prioritized for respective associated combinations of the grid hierarchy element and ones of the different forecast time scale periods. The relative priority values of one or more sets of the contextual influencing factors are iteratively weighted until a revised energy load forecast generated as a function of the weighted values via the model(s) is within a threshold value of a historic energy load data value for the associated combination of the grid hierarchy element and forecast time scale period.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 5 is a graphic illustration of an example of contextual influencing factor priorities according to an embodiment of the present invention.

DETAILED DESCRIPTION

Figure 1:
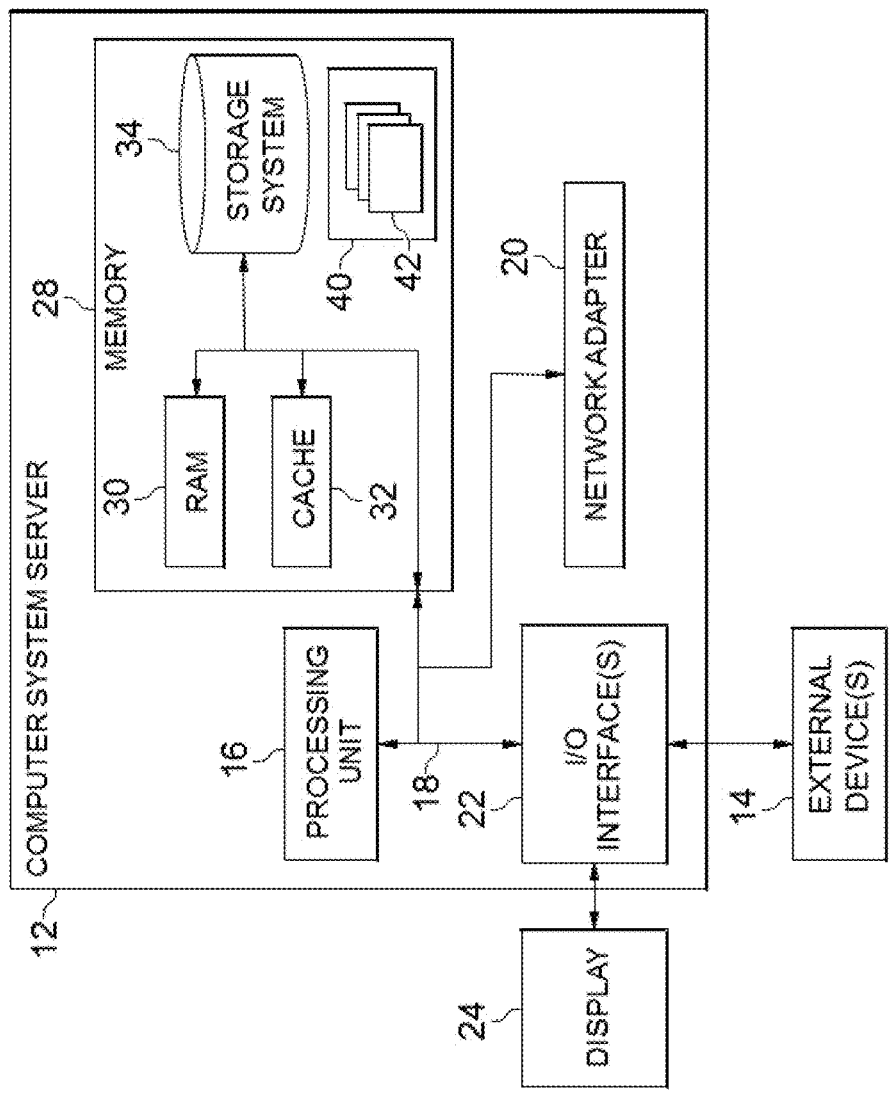
FIG. 1 depicts a cloud computing node according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

FIG. 1 is a schematic of an example of a programmable device implementation 10 according to an aspect of the present invention, which may function as a cloud computing node within a cloud computing environment. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
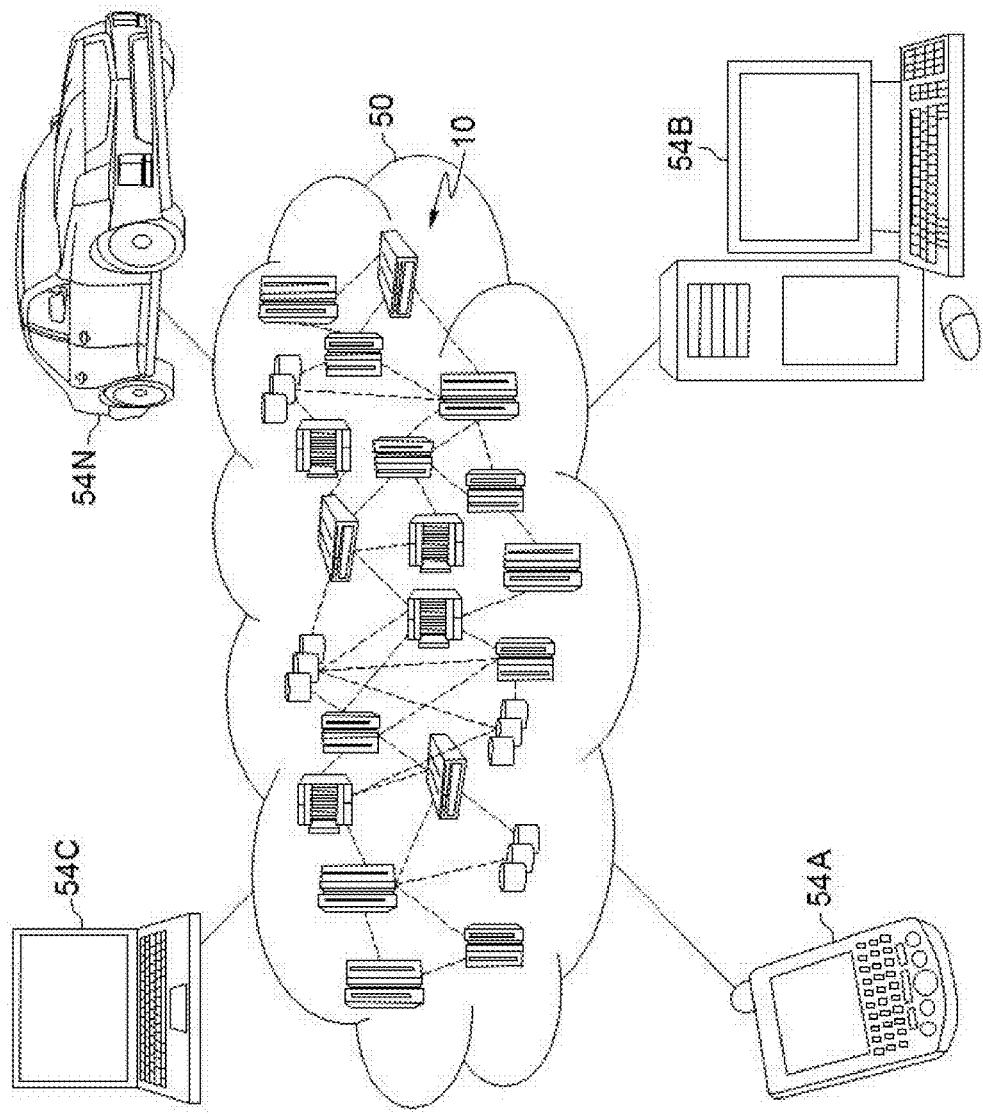
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
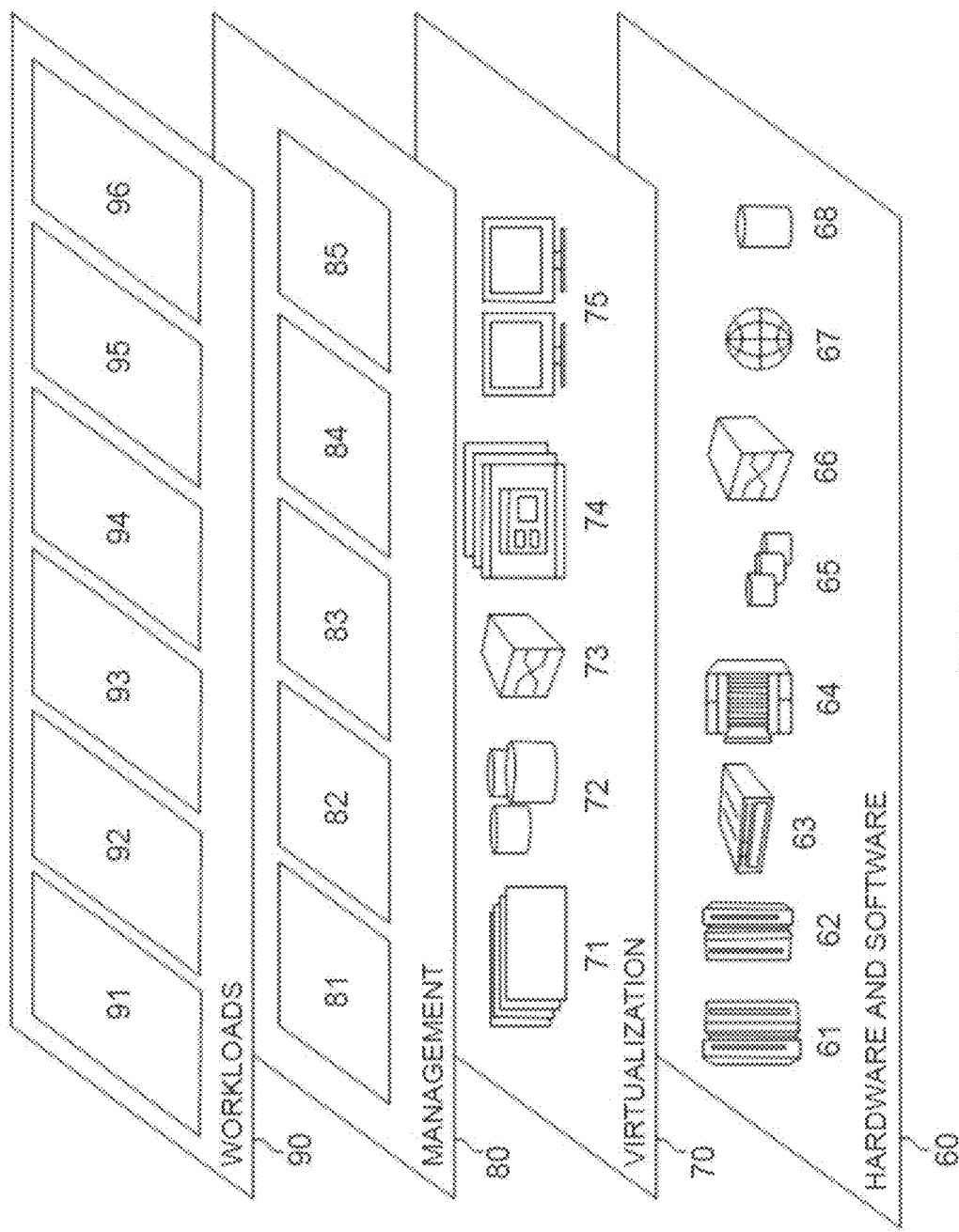
FIG. 3 depicts a computerized aspect according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at 96 processing for prioritizing and weighting model contextual influencing factors for energy load forecasting according to aspects of the present invention.

Figure 4:
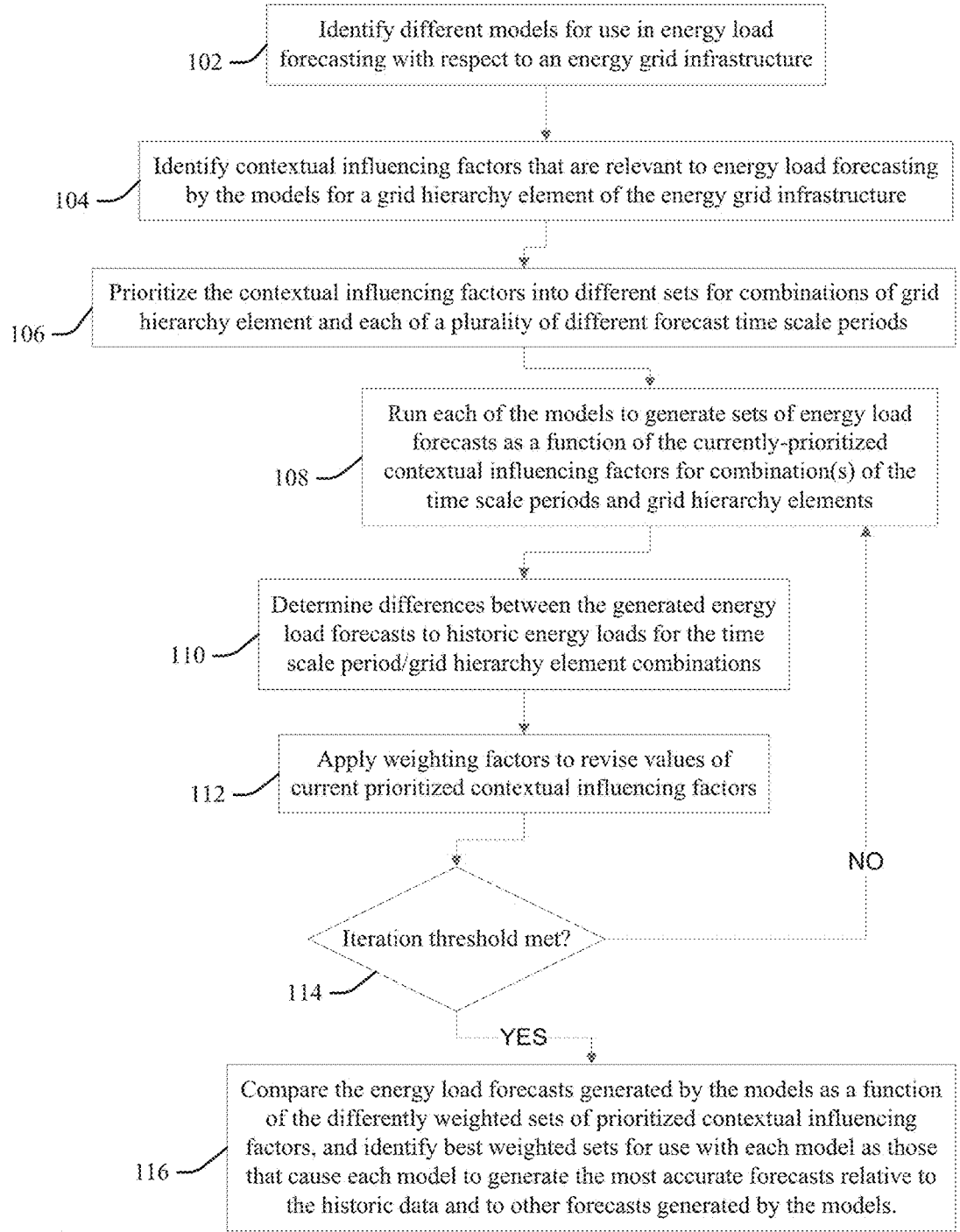
FIG. 4 is a flow chart illustration of a method or process according to an embodiment of the present invention for prioritizing and weighting model contextual influencing factors for energy load forecasting.

FIG. 4 (or "FIG. 4") illustrates a computer implemented method or process of an aspect of the present invention for prioritizing and weighting model contextual influencing factors for energy load forecasting. A processor (for example, a central processing unit (CPU)) executes code, such as code installed on a storage device in communication with the processor, and thereby performs the following process step elements illustrated in FIG. 4.

At 102, a plurality of different models are identified for use in energy load forecasting with respect to an energy grid infrastructure that comprises a plurality of different grid hierarchy elements. The grid hierarchy elements may include zonal substations, sub-transmission feeders, distribution substations, distribution feeders, sub-transmission substations, and still other appropriate energy grid infrastructure elements will be apparent to one skilled in the art. Illustrative but not limiting or exhaustive examples of the identified models include autoregressive integrated moving average ("ARIMA"), time series, vector, multi-variable linear regression and multi-variable non-linear regression models.

At 104 sets (pluralities) of different contextual influencing factors (or variables) are identified that are relevant to energy load forecasting by the models for each of a plurality of elements of an electrical grid hierarchy ("grid hierarchy elements") that define an energy grid infrastructure. Relevant influencing factors may vary among different utility organizations for a given group of grid hierarchy elements, for example as based on differing operational and environmental considerations.

FIG. 5 is a graphic spreadsheet illustration that provides a list of illustrative but not limiting or exhaustive examples of contextual influencing factors. Thus, "Utilization History" are factors determined for individual grid hierarchy elements (and/or for an overall energy grid infrastructure itself) to quantify an expected energy load or rate of usage from similar or benchmark elements or grids.

A "weather forecast" factor quantifies the effect of projected temperatures, wind and/or precipitation amounts that are above or below seasonal norms over a future time span. Such differences are associated with historic or predicted increases or decreases in energy demand for building heating or cooling systems that are served by one or more of the grid hierarchy elements, for example relative to typical demands for the climate season of the time period for which a weather forecast applies.

A "special event/festival" factor quantifies the effect of large occupancy loads from scheduled festivals, concerts, sporting events, etc., on a location, assembly facility, neighborhood, etc. Associated occupancy or attendance of such events may be associated historically with increases or decreases in energy demands relative to typical demands upon one or more of the grid hierarchy elements at the time and date of the event, for example in proportion to the projected increase or decrease of occupancy or attendance. Holidays may be associated with increases or decreases in energy demands by residential, business, school or other organizational users, as a result in changes in customer numbers and residency patterns relative to typical metrics for the same day of the week during a regular, non-holiday calendar day.

Economic factors are also practiced with the present invention. Thus, a "macro economic" factor quantifies a macroeconomic trend of growth or expansion, or of contraction, of economic activity projected for a region served by the grid hierarchy elements that consumes energy and thereby imparts a corresponding increase or decrease in energy load on grid hierarchy elements. Finer grained, more targeted contextual influencing factors include "Growth/Expansion Industrial," which quantifies projected growth/expansion or contraction of industrial end users (factory, manufacturing, shipping, etc.); and "Growth/Expansion Commercial and "Growth/Expansion Residential" quantify the impact of commercial and residential sectors of customer bases, respectively, as each may be independently and directly associated with quantified increases or decreases in resultant energy demands.

A "Renewable Energy Generation" contextual influencing factor quantifies amounts or rates of projected energy generation fed back into the grid from connected renewable energy sources. Illustrative but not limiting or exhaustive examples include solar panels, wind turbines, biomass plants, wave generation, etc. This factor may reflect the sale or return of energy back to the utility by a consumer or other end-user of excess energy generated by said sources, thereby adding to grid load capacity.

A "Green Aware End Users" contextual influencing factor reflects positive (or negative) impacts on grid element capacity caused by energy savings actions taken by end users, for example in migrating some energy sourcing from the grid to solar devices installed on site, or in installing higher efficiency devices or otherwise reducing (or increasing) consumption from current loads.

At 106 the contextual influencing factors are prioritized into sets for combinations of each of the grid hierarchy elements with each of a plurality of different forecast time scale periods. Time scale periods for energy load forecasting generally include immediate, short term, mid-term and long term forecast horizon periods, though more or less period may be practiced. A wide variety of time values may be used to define the different lengths of each time scale period. Generally, the shortest time period is the immediate period, which spans from an earliest or current time to the end of a designate period of time (for example, as defined in minutes, hours, days, weeks, etc.). The short term, mid-term and long term periods are progressively longer periods that may be defined by any period of interest, including hours, days, months, seasons of the year (for example, summer months, winter months, etc.), annual periods and multi-year periods. They may be defined by a variety of criteria, including business timeframes (for example, fiscal year, five-year projection, etc.), and may vary from energy grid infrastructure utility to utility.

In some aspects, the time scale periods are defined by other business entity criteria. For example, a forecasting group in a distribution company that supports rate making and revenue projection may define a short term period as one to five years ahead, and long term as 10 to 20 years ahead. In contrast, the operations group for an independent system operator may define an immediate/very short term period as five to 15 minutes ahead, the short term period as a few hours to one day ahead, a medium term period as five days ahead and a long term period as two weeks ahead. Policy makers may define long term forecasting time scale periods as 30 to 50 years ahead, and anything below 30 years as a short and/or medium term time scale period. A retailer may consider short term as one week ahead, a medium term as one week to a few months ahead, and long term as up to two years ahead.

Prioritization assigned to the contextual influencing factors within each set at 106 is a function of the combination selection of the grid hierarchy element and a time scale period for each set, wherein the priorities for two or more of the factors will differ for different combinations of grid hierarchy element and time scale period. In the example of FIG. 5 respective relative initial priorities (or weights or rankings) for the contextual influencing factors are determined on a scale of one to nine within different respective sets that are assigned to each of different time scale periods in combination with one of the grid hierarchy elements (in this example, selected from a zonal substation, a sub-transmission feeder, a distribution substation, a distribution feeder and a sub-transmission substation. As illustrated the immediate forecast period for energy grid infrastructure load forecasting in this example is the next 24 hours (or day), the short-term period is one week, the medium ("mid term") time scale period is a month, and the long-term forecast period is one year.

In this example, the prior "utilization history" is the highest priority contextual influencer factor for all of the time scale periods, as indicated by its value of "1" in each set (though it may not be the highest priority factor in other aspects, not illustrated herein). The remaining priorities are allocated identically for the immediate and short term periods, and differentially for the mid-term and long term periods. For example, the next highest priority (indicated by the value "2") is the weather forecast for the immediate and short term periods, the "Macro Economic Factor" for the long term period, and the "Special event/Festival" for the mid-term period.

The illustrated priorities reflect that large scale economic forces have greater quantifiable impacts over the long term, thus prioritizing "Macro Economic Factor" second, Growth/Expansion Industrial third, Growth/Expansion Commercial fourth and Growth/Expansion Residential fifth in priority, relative to the other, remaining influencing factors, as the effect of these factors is likely more pronounced over the longer time frame. In contrast, these factors have much lower priority relative to the weather forecast and other factors in the immediate and short term forecasting periods, as the influence of such large scale, macro industrial growth/expansion or contraction activities is much less impactful over these shorter term periods.

It will be appreciated that the priorities will be different for different gird elements in combinations with similar time periods. For example, the "Renewable Energy Generation" factor may be assigned a higher priority for a distribution feeder grid hierarchy element for one of the time scale periods, reflecting its greater impact on the energy loading supported thereby, relative to a priority assigned (initial weight) to a sub transmission feeder grid hierarchy element in combination with the same time period, since the proportionate contribution to the total energy load is much smaller. Contextual influencing factor prioritization at 106 may also vary from utility to utility organization based on many operational and environmental considerations.

Referring again to FIG. 4, at 108 each of the models identified at 102 is run to generate respective sets of energy load forecasts for one (or more) of the combinations of the time scale periods and grid hierarchy elements as a function of its/their respective set(s) of currently-prioritized contextual influencing factors.

At 110 the generated energy load forecasts are compared to actual, historic energy loads for the time scale period/grid hierarchy element combinations to determine differences between the historic forecast energy loads and the energy loads generated as a function of the current set of prioritized contextual influencing factors. Aspects perform prioritization and weight assignment of the contextual variables with respect to historical time period as the load forecast output is compared to the actual energy load for that time period.

At 112 weighting factors are applied to the current prioritized contextual influencing factors, thereby generating revised value of the prioritized contextual influencing factors. Thus, via the iterative inquiry at 114, the process repeats the steps of 108 and 110 to generate energy load forecasts for each of differently weighted sets of the prioritized contextual influencing factors of the combinations of the time scale periods and grid hierarchy elements, until an iterative threshold condition or value is met. The threshold may be a number of iterations specified, or determined, as a function of processing time and resources. The iterative threshold condition may also be a precision value that quantifies a maximum difference value between the differences determined between the historic forecast energy loads and the energy loads generated as a function of the current set of prioritized contextual influencing factors at 110, wherein the iterations repeat until the difference does not exceed the precision value.

At 116 the energy load forecasts generated by the models as a function of the differently weighted sets of prioritized contextual influencing factors are compared to each other and to the historic (sample) data, and the best weighted sets identified for use with each model, those that cause each model to generate the most accurate forecasts relative to the historic data and to other forecasts generated by the models.

Figures 6, 7, 8:
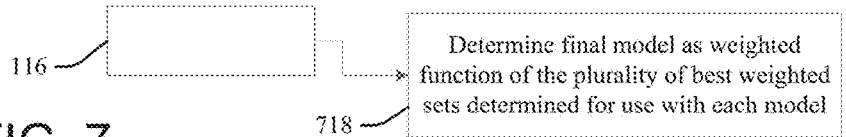
FIG. 6 is a graphic illustration of an example of selecting best weighted sets of contextual influencing factors according to the present invention.
FIG. 7 is a flow chart illustration of an alternative embodiment of a method or process according to the present invention for prioritizing and weighting model contextual influencing factors for energy load forecasting.
FIG. 8 is a tabular representation of an example of results of the method or process of FIG. 7.

FIG. 6 illustrates one example of selecting the best weighted sets of the contextual influencing factors shown in FIG. 5 according to the process or system of FIG. 4, with respect to three different models identified at 102: a time series model ("M1"), a multi-variable linear regression model ("M2") and a multi-variable non-linear regression model ("M3"). Eight of the prioritized contextual influencing factors denoted as "F1" through "F8," for example as selected from the factors illustrated in FIG. 4, though other factors may be practiced. Three different weighting are applied to the factors, "W1," "W2" and "W3," via the iterative process at steps 106 through 114 of FIG. 4, wherein a first or selected set ("W1") represents the initial weightings of the factors. Thus, each model has three iterations of generating loading forecasts, resulting in M1W1, M1W2, and M1W3 for the three iterations of M1, etc.

The root mean squared error values listed at the bottom of the table of FIG. 6 indicates the difference in the load forecasts generated by each of the weighted-set model iterations from historic data, wherein the lowest value of the three iterations for each model is indicated as the best set of weights: the first weight set for the time series model ("M1W1"), and the second weight set for each of the multi-variable linear regression and multi-variable non-linear regression models ("M2W2" and "M3W2").

Thus, a different iteration of weighted, prioritized contextual influencing factors may produce the best (most accurate) results for each of the different models: the first iteration for the first model (M1W1), while the second iteration works best with the other two models (M2W2 and M3W2). This may result in a different weighting/prioritization determined in the first iteration (W1) for application of the "macro economic" factor to the time series model (M1)

for a combination of the long term time scale period and a zonal substation grid hierarchy element, a relative to the second iteration of the weighting/prioritization (W2) determined for application of the same "macro economic" factor to the multi-variable linear regression model (M2) and the multi-variable non-linear regression model (M3).

FIG. 7 illustrates an alternative embodiment of the process or system of FIG. 4, wherein an additional process at 718, that is subsequent to the step 116 of FIG. 4, determines a final model as a weighted function of the plurality of best weighted model/sets determined at 116, wherein each of which in turn is a weighed function of influencing factors for the respective model (M1, M2 or M3), according to the following weighted function of "m" beset models:

$$MFINAL = f(W1M1w1\text{-}FINAL, \ldots, WmMmwm\text{-}FINAL).$$

"Miwi-FINAL" is the "ith" best iteration configuration of the model ("Mi") with weighed influencing factors, where "Wi" is the final weight assigned to model configuration "Miwi-FINAL." This function determines the best model among all the best weighted set models corresponding to each model type that minimizes error, and thereby maximizes accuracy of the final model.

FIG. 8 is a tabular representation of the results of step 718, wherein a "final set 5" has the lowest value of root mean squared error and is thereby identified as the best final model weighted function of the plurality of best weighted model/sets, determined according to the following function:

$$M\_FINAL = f'((M1W1 \times 0.5), (M2W2 \times 0.25), (M3W2 \times 0.25)) =$$
$$f'(f(F1), f((F1 \times 0.05), F2 \times 0.05), (F3 \times 0.15), (F4 \times 0.15),$$
$$(F5 \times 0.15), (F6 \times 0.15), (F7 \times 0.15), (F8 \times 0.15)),$$
$$f((F1 \times 0.2), (F2 \times 0.15), (F3 \times 0.15), (F4 \times 0.15),$$
$$(F5 \times 0.15), (F6 \times 0.1), (F7 \times 0.05), (F8 \times 0.05))$$

Thus, aspects provide frameworks that provide flexibility in selecting, prioritizing and assigning weightage to the variables that can be applied to any of a variety of different energy forecasting models, methods and algorithms. Over a period of self-learning through multiple iterations, automated aspects of the present invention determine the best, most appropriate weighted priority of contextual influencing factors for selected models, and in some aspects select a best model. The weightings may be responsive to operational and environmental considerations or a particular utility and grid element location as reflected in the resulting forecast values.

Different models generally used different mechanisms for factoring in timescale and grid hierarchy variables, as well as structures for optimizing error or inaccuracy into generated solutions, wherein the values or impacts of a given factor may vary widely and thereby make direct comparison difficult or impossible. In contrast, aspects of the present invention enable a single determination and weighting adjustment process to set and adjust quantified influencing factors that are applied universally to different models.

By simultaneously considering multiple models in generating energy load forecasting from a given set of weighted and prioritized contextual influencing factors aspects reduce the cycle time required to achieve accurate load forecast models relative to prior art techniques.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for prioritizing and weighting model contextual influencing factors for energy load forecasting, the method comprising executing on a computer processor:

identifying via an application executing on a client platform computing node a plurality of contextual influencing factors as each relevant to use for energy load forecasting for an energy grid infrastructure element as a function of at least one energy forecasting model, wherein the energy grid infrastructure element is one of a zonal substation, a sub-transmission feeder, a distribution substation, a distribution feeder and a sub-transmission substation;

rank prioritizing via the application executing on the client platform computing node the contextual influencing factors into each of a plurality of different prioritized sets that each have different relative priority values assigned to each of the contextual influencing factors within the different respective sets as a function of differences in relevance determined for each of different combinations of the grid hierarchy element with ones each of a plurality of different forecast time scale periods, wherein the rank prioritizing of the contextual influencing factors generates different assignments of the relative priority values to ones of the contextual influencing factors within at least two of the different prioritized sets;

generating, via the application executing on the client platform computing node applying the at least one model for energy load forecasting, energy load forecast values for the grid hierarchy element for each of the plurality of different forecast time scale periods as a function of respective ones of the different prioritized sets of the contextual influencing factor relative priority values that are each prioritized for respective associated ones of the different combinations of the grid hierarchy element with respective ones of the plurality of different forecast time scale periods; and iteratively weighting the relative priority values of a selected set of the prioritized sets of contextual influencing factors, and generating via the at least one model for energy load forecasting, a revised energy load forecast value for the grid hierarchy element as a function of the weighted relative priority values via the application executing on the client platform computing node, until the revised energy load forecast is within a threshold value of a historic energy load data value for the combination of the grid hierarchy element and the forecast time scale period that is associated with the selected set of the prioritized sets of contextual influencing factors.

2. The method of claim 1, further comprising:

integrating computer-readable program code into a computer system comprising the processor that executing the application on the client platform computing node, a computer readable memory in circuit communication with the processor, and a computer readable storage medium in circuit communication with the processor; and wherein the processor executes program code instructions stored on the computer-readable storage medium via the computer readable memory and thereby performs the steps of identifying the plurality of contextual influencing factors, rank prioritizing the contextual influencing factors into the different prioritized sets of relative priority values, generating the energy load forecast values for the grid hierarchy element for each of the plurality of different forecast time scale periods, and iteratively weighting the relative priority values of the selected set of the prioritized sets of contextual influencing factors and generating via the at least one model for energy load forecasting the revised energy load forecast value.

3. The method of claim 1, wherein the at least one model for energy load forecasting for the energy grid infrastructure element is a plurality of different models, the method further comprising:

identifying a plurality of different best weighted sets of the iteratively reweighted relative priority values of the contextual influencing factors of the selected set of the prioritized sets, one each for different respective ones of the plurality of different models, in response to generating most accurate forecast values relative to historic energy load data values for different respective ones of the plurality of different models.

4. The method of claim 3, further comprising:

choosing the different best weighted sets of the iteratively reweighted relative priority values of the selected set of the prioritized sets of contextual influencing factors as a function of generating lowest root mean squared error values relative to the historic energy load data values for different respective ones of the plurality of different models.

5. The method of claim 4, further comprising:

determining a final model as a weighted function of identified plurality of different best weighted sets of the iteratively reweighted relative priority values of the selected set of the prioritized sets of contextual influencing factors.

6. The method of claim 5, wherein the plurality of different forecast time scale periods comprises an immediate forecast horizon period, a short term forecast horizon period, a mid-term forecast horizon period and a long term forecast horizon period.

7. The method of claim 6, wherein the plurality of contextual influencing factors comprises:

a utilization history factor that quantifies an expected energy load or rate of usage for the grid hierarchy element;

a weather forecast factor that quantifies an effect of projected temperatures, wind amounts or precipitation amounts that differ from a seasonal norm over at least one of the time scale periods; and an economic factor that quantifies a trend of change in an amount of economic activity projected for a region served by the grid hierarchy element that consumes energy and thereby imparts a corresponding change in an amount of energy load on the grid hierarchy element for at least one of the time scale periods.

8. A system, comprising:

a processor on a client platform computing node;

a computer readable memory in circuit communication with the processor; and a computer readable storage medium in circuit communication with the processor;

wherein the processor executes program instructions stored on the computer-readable storage medium via the computer readable memory and thereby:

identifies via an application executing on the client platform computing node processor a plurality of contextual influencing factors as each relevant to use for energy load forecasting for an energy grid infrastructure element as a function of at least one energy forecasting model, wherein the energy grid infrastructure element is one of a zonal substation, a sub-transmission feeder, a distribution substation, a distribution feeder and a sub-transmission substation;

rank prioritizes via the application executing on the client platform computing node the contextual influencing factors into each of a plurality of different prioritized sets that each have different relative priority values assigned to each of the contextual influencing factors within the different respective sets as a function of differences in relevance determined for each of different combinations of the grid hierarchy element with ones each of a plurality of different forecast time scale periods, wherein the rank prioritizing of the contextual influencing factors generates different assignments of the relative priority values to ones of the contextual influencing factors within at least two of the different prioritized sets;

generates, via the application executing on the client platform computing node applying the at least one model for energy load forecasting, energy load forecast values for the grid hierarchy element for each of the plurality of different forecast time scale periods as a function of respective ones of the different prioritized sets of the contextual influencing factor relative priority values that are each prioritized for respective associated ones of the different combinations of the grid hierarchy element with respective ones of the plurality of different forecast time scale periods; and iteratively weights the relative priority values of a selected set of the prioritized sets of contextual influencing factors, and generates via the at least one model for energy load forecasting a revised energy load forecast value for the grid hierarchy element as a function of the weighted relative priority values, via the application executing on the client platform computing node, until the revised energy load forecast is within a threshold value of a historic energy load data value for the combination of the grid hierarchy element and the forecast time scale period that is associated with the selected set of the prioritized sets of contextual influencing factors.

9. The system of claim 8, wherein the at least one model for energy load forecasting for the energy grid infrastructure element is a plurality of different models; and
wherein the processor executes the program instructions stored on the computer-readable storage medium via the computer readable memory and thereby identifies a plurality of different best weighted sets of the iteratively reweighted relative priority values of the contextual influencing factors of the selected set of the prioritized sets, one each for different respective ones of the plurality of different models, in response to generating most accurate forecast values relative to historic energy load data values for different respective ones of the plurality of different models.

10. The system of claim 9, wherein the processor executes the program instructions stored on the computer-readable storage medium via the computer readable memory and thereby chooses the different best weighted sets of the iteratively reweighted relative priority values of the selected set of the prioritized sets of contextual influencing factors as a function of generating lowest root mean squared error values relative to the historic energy load data values for different respective ones of the plurality of different models.

11. The system of claim 10, wherein the processor executes the program instructions stored on the computer-readable storage medium via the computer readable memory and thereby determines a final model as a weighted function of identified plurality of different best weighted sets of the iteratively reweighted relative priority values of the selected set of the prioritized sets of contextual influencing factors.

12. The system of claim 11, wherein the plurality of different forecast time scale periods comprises an immediate forecast horizon period, a short term forecast horizon period, a mid-term forecast horizon period and a long term forecast horizon period.

13. The system of claim 12, wherein the plurality of contextual influencing factors comprises:
a utilization history factor that quantifies an expected energy load or rate of usage for the grid hierarchy element;
a weather forecast factor that quantifies an effect of projected temperatures, wind amounts or precipitation amounts that differ from a seasonal norm over at least one of the time scale periods; and
an economic factor that quantifies a trend of change in an amount of economic activity projected for a region served by the grid hierarchy element that consumes energy and thereby imparts a corresponding change in an amount of energy load on the grid hierarchy element for at least one of the time scale periods.

14. The system of claim 13, wherein the program instructions stored on the computer-readable storage medium are provided as a service in a cloud environment.

15. A computer program product for prioritizing and weighting model contextual influencing factors for energy load forecasting, the computer program product comprising:
a computer readable storage medium having computer readable program code embodied therewith, wherein the computer readable storage medium is not a transitory signal per se, the computer readable program code comprising instructions for execution by a processor on a client platform computing node that cause the processor to:
identify via an application executing on the client platform computing node processor a plurality of contextual influencing factors as each relevant to use for energy load forecasting for an energy grid infrastructure element as a function of at least one energy forecasting model, wherein the energy grid infrastructure element is one of a zonal substation, a sub-transmission feeder, a distribution substation, a distribution feeder and a sub-transmission substation;
rank prioritize via the application executing on the client platform computing node the contextual influencing factors into each of a plurality of different prioritized sets that each have different relative priority values assigned to each of the contextual influencing factors within the different respective sets as a function of differences in relevance determined for each of different combinations of the grid hierarchy element with ones each of a plurality of different forecast time scale periods, wherein the rank prioritizing of the contextual influencing factors generates different assignments of the relative priority values to ones of the contextual influencing factors within at least two of the different prioritized sets;
generate, via the application executing on the client platform computing node applying the at least one model for energy load forecasting, energy load forecast values for the grid hierarchy element for each of the plurality of different forecast time scale periods as a function of respective ones of the different prioritized sets of the contextual influencing factor relative priority values that are each prioritized for respective associated ones of the different combinations of the grid hierarchy element with respective ones of the plurality of different forecast time scale periods; and
iteratively weight the relative priority values of a selected set of the prioritized sets of contextual influencing factors, and generates via the at least one model for energy load forecasting a revised energy load forecast value for the grid hierarchy element as a function of the weighted relative priority values, via the application executing on the client platform computing node, until the revised energy load forecast is within a threshold value of a historic energy load data value for the combination of the grid hierarchy element and the forecast time scale period that is associated with the selected set of the prioritized sets of contextual influencing factors.

16. The computer program product of claim 15, wherein the at least one model for energy load forecasting for the energy grid infrastructure element is a plurality of different models; and
wherein the computer readable program code instructions for execution by the processor further cause the processor to identify a plurality of different best weighted sets of the iteratively reweighted relative priority values of the contextual influencing factors of the selected set of the prioritized sets, one each for different respective ones of the plurality of different models, in response to generating most accurate forecast values relative to historic energy load data values for different respective ones of the plurality of different models.

17. The computer program product of claim 16, wherein the computer readable program code instructions for execution by the processor further cause the processor to choose the different best weighted sets of the iteratively reweighted relative priority values of the selected set of the prioritized sets of contextual influencing factors as a function of generating lowest root mean squared error values relative to the historic energy load data values for different respective ones of the plurality of different models.

18. The computer program product of claim 17, wherein the computer readable program code instructions for execution by the processor further cause the processor to determine a final model as a weighted function of identified plurality of different best weighted sets of the iteratively reweighted relative priority values of the selected set of the prioritized sets of contextual influencing factors.

19. The computer program product of claim 18, wherein the plurality of different forecast time scale periods comprises an immediate forecast horizon period, a short term forecast horizon period, a mid-term forecast horizon period and a long term forecast horizon period.

20. The computer program product of claim 19, wherein the plurality of contextual influencing factors comprises:

a utilization history factor that quantifies an expected energy load or rate of usage for the grid hierarchy element;

a weather forecast factor that quantifies an effect of projected temperatures, wind amounts or precipitation amounts that differ from a seasonal norm over at least one of the time scale periods; and an economic factor that quantifies a trend of change in an amount of economic activity projected for a region served by the grid hierarchy element that consumes energy and thereby imparts a corresponding change in an amount of energy load on the grid hierarchy element for at least one of the time scale periods.

* * * * *